United States Patent
Ammar et al.

(10) Patent No.: US 6,594,479 B2
(45) Date of Patent: Jul. 15, 2003

(54) LOW COST MMW TRANSCEIVER PACKAGING

(75) Inventors: Danny F. Ammar, Windermere, FL (US); Gavin James Clark, Tavares, FL (US); Eugene Fischer, Clermont, FL (US); John F. Hubert, Windermere, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 256 days.

(21) Appl. No.: 09/749,425

(22) Filed: Dec. 28, 2000

(65) Prior Publication Data

US 2002/0086655 A1 Jul. 4, 2002

(51) Int. Cl.⁷ .............................. H04B 1/08; H04B 1/38; H05K 9/00; H05K 7/20
(52) U.S. Cl. ........................ 455/347; 455/90; 361/715; 361/818
(58) Field of Search ................................ 361/715, 704, 361/707, 710, 800, 816, 818, 826, 736, 752, 753, 757, 759, 796, 799; 174/50, 35 R, 50.5, 50.52, 50.6; 333/246, 247, 260; 455/90, 128, 347–351, 73, 78, 82, 83, 344, 556, 550, 575; 340/697.5–693.12, 572.8, 7.63; 342/175

(56) References Cited

U.S. PATENT DOCUMENTS

| | | |
|---|---|---|
| 4,490,684 A | 12/1984 | Epsom et al. |
| 4,490,721 A | 12/1984 | Stockton et al. ............ 342/368 |
| 4,870,421 A | 9/1989 | Peil et al. .................... 342/175 |
| 4,967,201 A | 10/1990 | Rich, III ...................... 342/175 |
| 5,111,199 A * | 5/1992 | Tomoda et al. ............. 455/128 |
| 5,247,309 A | 9/1993 | Reich .......................... 342/175 |
| 5,315,303 A | 5/1994 | Tsou et al. .................... 342/27 |
| 5,422,783 A * | 6/1995 | Darbee ........................ 361/680 |
| 5,493,305 A | 2/1996 | Wooldridge et al. ........ 342/368 |
| 5,512,901 A | 4/1996 | Chen et al. .................. 342/175 |
| 5,588,041 A * | 12/1996 | Meyer, Jr. et al. .......... 455/569 |
| 5,680,139 A | 10/1997 | Huguenin et al. ........... 342/175 |
| 5,867,120 A | 2/1999 | Ishikawa et al. ............ 342/175 |
| 5,914,684 A | 6/1999 | Brettner, III ................ 342/175 |
| 5,945,941 A | 8/1999 | Rich, III et al. ............ 342/175 |
| 6,064,341 A * | 5/2000 | Hassemer .................... 343/702 |
| 6,157,545 A * | 12/2000 | Janninck et al. ............ 361/814 |

\* cited by examiner

Primary Examiner—Vivian Chin
Assistant Examiner—Eliseo Ramos-Feliciano
(74) Attorney, Agent, or Firm—Burns, Doane, Swecker & Mathis, LLP

(57) ABSTRACT

A millimeter wave transceiver package is provided. Housings for electronic, RF, and support components of the transceiver with an RF transparent cover are stacked vertically in a multilayer structure. The channelized RF housing affects a reduction of 5:1 by minimizing the components placed on the housing. The design and position of the regulator/controller allows the use of surface mount parts and simplified DC and RF interfaces further contributing to design efficiency and reduced costs. Additionally, costs are reduced through the appropriate selection and application of materials. The generic housing for the millimeter wave module assembly accommodates frequencies from 20 to 40 GHz without design change, thus improving the modular character.

19 Claims, 4 Drawing Sheets

LOW COST MMW TRANSCEIVER PACKAGING

BACKGROUND

1. Field of the Invention

The present device is directed generally to the packaging for an electronics module. More specifically, the present invention is directed to the architecture of the packaging that houses a single module, either a transmitter or a receiver, of a millimeter wave device.

2. Background Information

The main components in millimeter wave (MMW) transceivers are monolithic millimeter wave integrated circuit (MMIC) chips, connective substrates, housings, and DC regulators/controllers. It has traditionally been difficult to design and build very wideband amplifiers that display consistent performance across the entire passband. Gain irregularities and peaks, large variations of input and output impedance, and spurious oscillations are examples of the problems encountered.

Monolithic millimeter wave integrated circuit (MMIC) devices are low-cost solutions to the problems. The cost of MMIC chips and substrates have been steadily falling in the last few years due to improved yield and increased demand for commercial telecommunication applications. However, the two areas of housings and regulators/controllers have not enjoyed similar cost reductions because, for example, Coefficient of Thermal Expansion (CTE) matching and thermal conductivity requirements limit the material choices for packaging and make it difficult to reduce costs.

U.S. Pat. No. 4,490,721, issued to Stockton et al., the disclosure of which is hereby incorporated by reference, discloses the fabrication of MMIC components and their interconnects onto a single substrate by using thin film and IC fabrication techniques.

U.S. Pat. No. 5,945,941, issued to Rich, III et al., the disclosure of which is hereby incorporated by reference, discloses a pulsed radar apparatus and method for employing a power distribution system having reduced cost and weight and enhanced efficiency and reliability. The power distribution system is provided in a radar apparatus to distribute power from a 270 VDC source through an intermediate power converter and very high frequency (VHF) regulator/modulator units. Costs are reduced through the use of electrical components with increased efficiency.

U.S. Pat. No. 5,493,305, issued to Woodbridge et al., the disclosure of which is hereby incorporated by reference, discloses a vertical, multi-layer arrangement of MMIC chips to facilitate automated assembly and increase yields.

SUMMARY OF THE INVENTION

The present invention is directed to reducing the cost of MMW housings through the appropriate selection and application of materials. The cost of the regulator/controller can be reduced through the use of surface mount parts and simplified DC and RF interfaces. Exemplary embodiments provide a generic housing for MMW module assemblies that accommodate frequencies from 20 to 40 GHz without changing the design, thus improving the modularity.

An exemplary millimeter wave transceiver package in accordance with the present invention comprises a multi-layered structure of planar housings stacked vertically. A cover to an electrical housing and a surface mount board is positioned at a first edge of the vertical stack. A surface mount board is positioned as a second layer. The third layer is an electrical housing made from aluminum and comprising a regulator/controller. The RF components are housed in a fourth layer made from copper tungsten. A plurality of interconnected channels are recessed into a planar surface of the housing, either by machining or by the joining of a channelized layer and flat base layer. Only MMIC chips and connective substrates are disposed in the plurality of channels. An RF cover made from Kovar is disposed at a second edge of the vertical stack and forms a seal over the MMIC chips and connective substrates.

BRIEF DESCRIPTION OF THE DRAWING FIGURES

Other objects and advantages of the invention will become apparent from the following detailed description of preferred embodiments thereof in connection with the accompanying drawings in which like numerals designate like elements and in which.

DETAILED DESCRIPTION OF THE PREFERRED EMBODIMENTS

Figure 1:
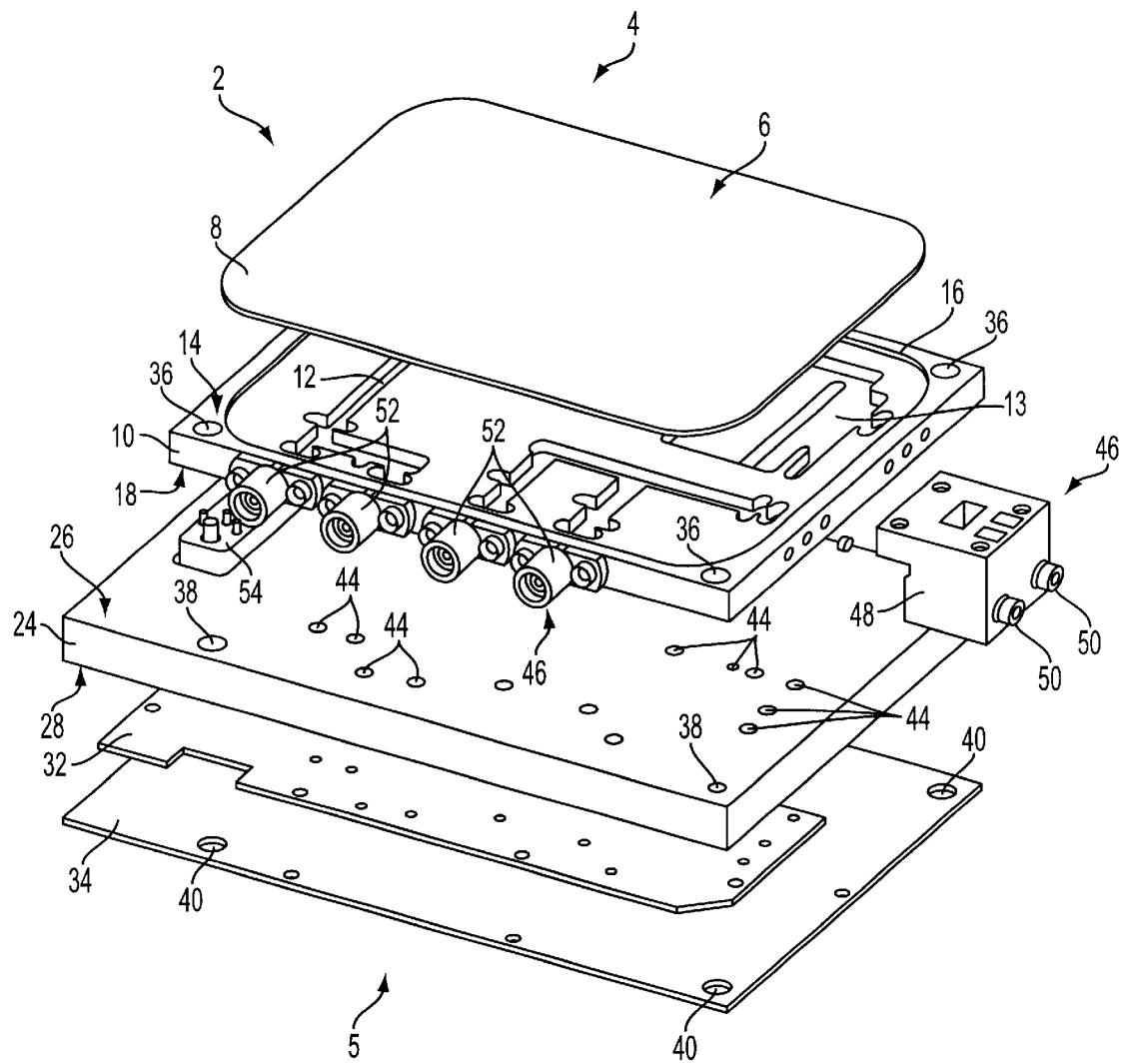
FIG. 1 is an exploded perspective view of a channelized housing as seen from the top and front.

FIG. 1 is a perspective view of an exemplary MMW transceiver package in which a multilayered structure is stacked vertically. In a first embodiment, a channelized MMW housing 2 has on first edge 4 of the vertical stack, a RF cover 6. The RF cover 6 is transparent to the frequency of the transceiver which will be placed within the housing 2. In the illustrated embodiment, the RF cover 6 is shown in the form of a substantially rectangular and planar sheet 8 which is positioned above a second layer which is the RF housing 10. Examples of suitable materials for the RF cover 6 are Kovar, nickel, cobalt, and iron. The RF housing 10 can be made of a suitable material that provides the appropriate thermal conductivity and coefficient of thermal expansion. In the illustrated embodiment, a suitable material is copper tungsten. The RF housing 10 is a monolithic structure and has a first planar surface 14 positioned toward the RF cover 6. On the first planar surface 14 is formed an internal recessed edge 16 corresponding to the shape of the RF cover 6. The recessed edge 16 is provided to allow for mating of the RF cover 6 to the RF housing 10. On the first planar surface 14 of the RF housing 10 are channels 12 and wells 13 which provide locations for the positioning of channelized connectors and MMIC chips, respectively.

The third layer of the vertical MMW housing 2 is the electrical housing 24. The electrical housing 24 can be made of suitable materials, such as aluminum, to provide engineering strength as well as appropriate thermal and conductivity properties. The first planar surface 26 of the electrical housing 24 abuts the second planar surface 18 of the RF housing 10. The second planar surface 28 of the electrical housing 24 is provided with a recessed edge 30 for the positioning of the subsequent layer, a surface mount board 32. The surface mount board 32 houses such components as the signal conditioning circuits and the control functions. Components are surface mounted using conventional techniques. Finally, positioned at a second edge 5 of the channelized MMW housing 2 is an electrical housing cover 34.

The multilayered channelized MMW housing 2 is assembled and held together by connectors (not shown) positioned at each of the four corners of the individual layers. The RF housing 10 has through holes 36 positioned at its corners which correspond to through holes 38 in the electrical housing 24 and through holes 40 in the electrical housing cover 34. DC feedthroughs 42 are provided between the RF housing 10 and the electrical housing 24 to provide electrical connections. These feedthroughs 42 mate with corresponding through holes 44 in the electrical housing 24. An interface 46 is provided to provide connections between multiple channelized housings 2 and/or other components. The interface 46 may be in the form of a waveguide 48 which is mounted to the RF housing 10 with, for example, bolts 50. Alternatively, an interface 46 may comprise of a coaxial interface 52. The coaxial interface 52 is also connected to the RF housing 10.

Figure 2:
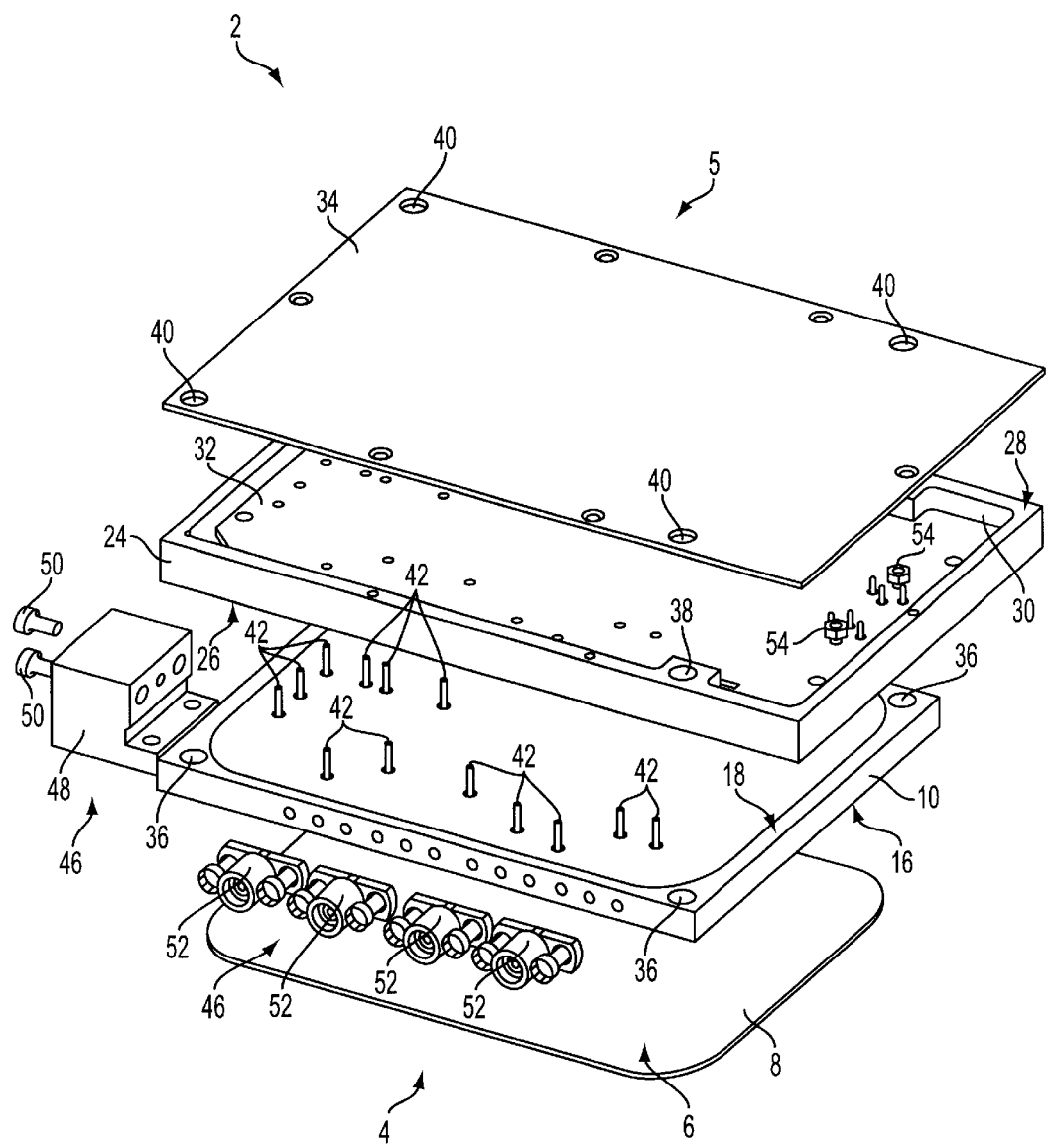
FIG. 2 is an exploded perspective view of a channelized housing as seen from the bottom and back.

FIG. 2 is an expanded perspective view of the channelized MMW housing 2 of FIG. 1. The view in FIG. 2 is from the lower back edge. In this view, the recessed edge 30 on the second planar surface 28 of the electrical housing 24 is clearly visible. Additionally, a connector 54 is visible which is housed in the electrical housing 24 and provides a point of connection for dc signals and ancillary equipment such as a computer interface, which is used to control functions within the MMW module.

Figure 3:
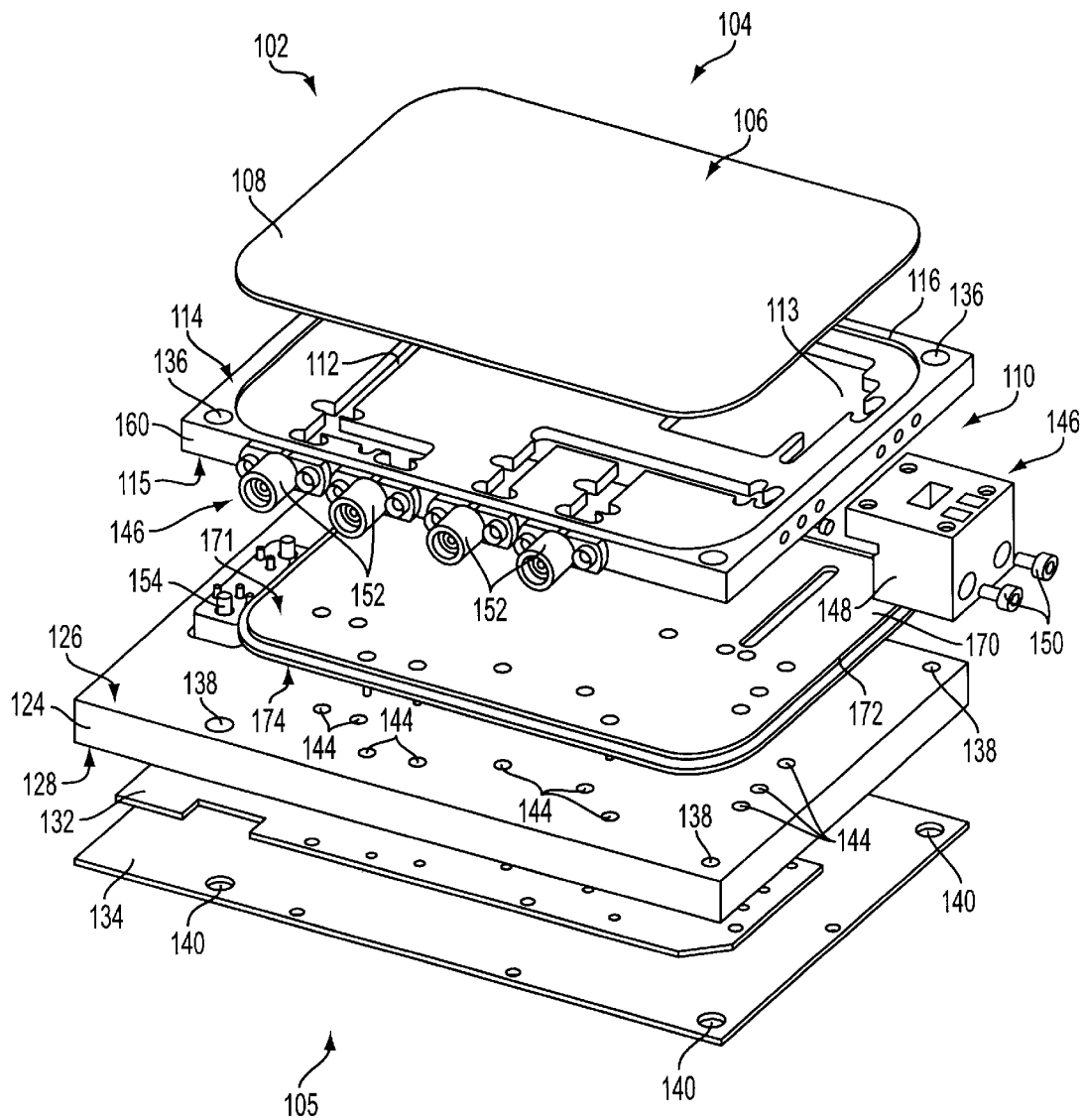
FIG. 3 is an exploded perspective view of a flat plate housing as seen from the top and front.

FIG. 3 is an expanded perspective view of a second embodiment of a channelized MMW housing 102. The housing 102 comprises a multilayered structure stacked vertically. On a first edge 104 of the vertical stack, a RF cover 106 is provided. The RF cover 106 is transparent to the frequency of the transceiver which will be placed within the housing 102. In the illustrated embodiment, the RF cover 106 is shown in the form of a substantially rectangular and planar sheet of Kovar 108 which is positioned above a second layer which is the RF housing 110. The RF housing 110 is comprised of two individual sections—a channelized RF section 160 and a flat plate 170. Both the RF section 160 and the flat plate 170 can be made of a suitable material that provides the appropriate thermal conductivity and coefficient of thermal expansion, such as copper tungsten. The RF section 160 has a first planar surface 114 positioned toward the RF cover 106. An internal recessed edge 116 corresponding to the shape of the RF cover 106 is formed on the first planar surface 114. The recessed edge 116 is provided to allow for mating of the RF cover 106 to the RF housing 110 and form an environmental seal when assembled. Channels 112 and wells 113 within the body of the RF section 160 receive channelized connectors and MMIC chips, respectively.

Additional embodiments can include components in addition to MMIC chips and connective substrates on the RF housing 10,110, such as capacitive and resistive elements.

An independent RF section 160 and flat plate 170 affords the use of surface mounting techniques for installing the RF components in the RF housing 110, which reduces costs and facilitates production by simplifying deposition of the epoxy for securing the MMIC chips and assembling the module 102. Additionally, the individual components 160, 170 of the RF housing 110 may be cast, further providing cost reductions over more expensive material preparation techniques.

There is a protruding lip 172 on the first planar surface 171 of the flat plate 170. The lip 172 mates to an inner recess 162 of the second planar surface 115 of the RF section 160.

An outer recess 164 correspond to the outer dimension of the flat plat 170. The RF section 160 and the flat plate 170 may be joined by mechanical or adhesive means.

The third layer of the vertical housing 102 is the electrical housing 124. The electrical housing 124 may be made of suitable materials, such as aluminum, to provide engineering strength as well as appropriate thermal and conductivity properties. The first planar surface 126 of the electrical housing 124 abuts the second planar surface 174 of the flat plate 170 of the RF housing 110. The second planar surface 128 of the electrical housing 124 is provided with a recessed edge 130 for the positioning of the subsequent layer, a surface mount board 132. Finally, positioned at a second edge 105 of the channelized MMW housing 102 is an electrical housing cover 134.

The multilayered channelized MMW housing 102 is assembled and held together by connectors (not shown) positioned at each of the four corners of the individual layers. The RF housing 110 has through holes 136 positioned at the corners of the RF section 160 which correspond to through holes 138 in the electrical housing 124 and through holes 140 in the electrical housing cover 134. DC feedthroughs 142 are provided between the flat plate 170 of the RF housing 110 and the electrical housing 124 to provide electrical connections. These feedthroughs 142 mate with corresponding through holes 144 in the electrical housing 124. An interface 146 is provided to form connections between multiple channelized housings 102 and/or other components. The interface 146 may be in the form of a waveguide 148 which is mounted to the RF section 160 of the RF housing 110 with, for example, bolts 150. Alternatively, an interface 146 may comprise of a coaxial interface 152. The coaxial interface 152 is also connected to the RF section 160 of the RF housing 10.

Figure 4:
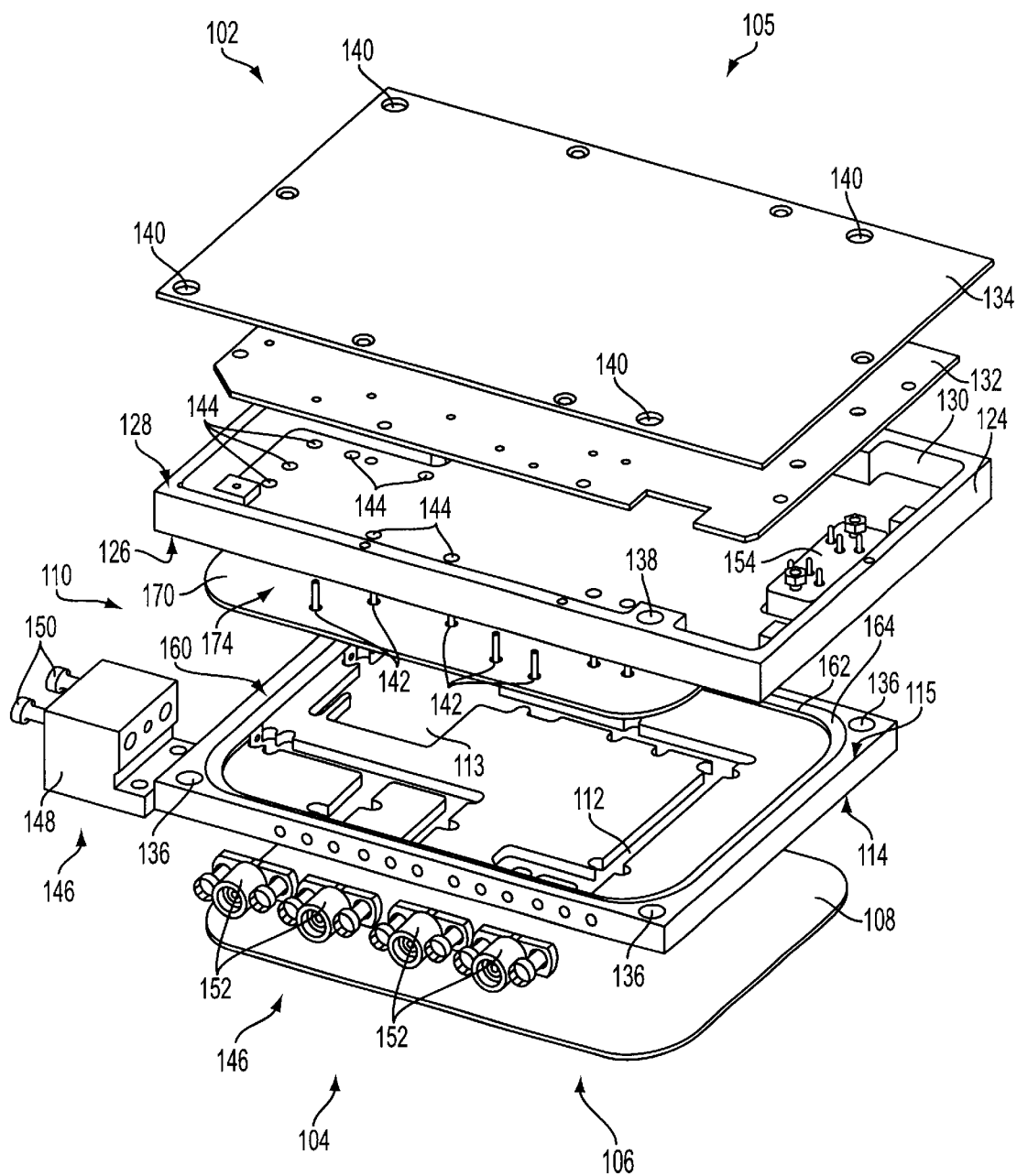
FIG. 4 is an exploded perspective view of a flat plate housing as seen from the bottom and back.

FIG. 4 is a expanded perspective view of the channelized MMW housing 102 of FIG. 3. The view in FIG. 4 is from the lower back edge. In this view, the inner recess 162 the outer recess 164 and the second planar surface 115 of the RF section 160 are more easily seen. In addition, the feedthroughs 142 may be seen on the second planar surface 174 of the flat plate 170. The recessed edge 130 on the second planar surface 128 of the electrical housing 124 is clearly visible. This recess is provided for mating the surface mount board 132 to the electrical housing 124. Additionally, a connector 154 is visible which is housed in the electrical housing 124.

The regulator/controller on the electrical housing 24, 124 can be constructed from larger surface mount parts. It also can serve as a secondary heat sink due to its large volume and high thermal conductivity.

Due to the relocation of some devices from the RF housing, the RF channels 12, 13 of the MMW housing 2, 102 can be made larger to accommodate frequencies from 20 to 40 GHz without any changes to the housing module. This allows the MMW housing to be flexible in its applied uses.

One method by which the MMIC die and thin film substrates are attached to the housing 10, 110 is by the use of silver-based conductive epoxy. Excessive epoxy can cause shorts, while lack of adequate epoxy can allow the chips to fall off and impacts module reliability.

Different methods have been used to control the amount of epoxy. The use of automatic epoxy deposition in the fine tolerances of a monolithic housing with small channel widths has been very challenging. In tight RF channels, spiral and dot patterns have been utilized to overcome the difficulties and are among the most popular methods of epoxy deposition. The proposed flat plate housing 30 allows the use of epoxy screening, which has the advantage of being easily controlled which helps to reduce costs.

Housing

GaAs MMIC chips expand and contract over the temperature ranges encountered during use requiring the surface on which the chips are mounted to expand similarly over the same temperature range. Failure to have a closely matched coefficient of thermal expansion between the chip and the housing results in chip cracking, separation from the surface, and damage. In addition, the chips generate a large amount of heat and require a housing and packaging material with sufficiently high thermal conductivity to rapidly remove the heat. The efficient removal of heat contributes toward extending the life of the MMIC chips.

These characteristics limit the choices of possible materials. Several examples of suitable materials include Copper Tungsten (CuW), Aluminum Silicon Carbide (Al—SiC), Aluminum graphite (Al-graphite), and Copper Molybdenum (CuMo).

One example of a material for use as the housing is CuW. The raw material for CuW has the advantages of relatively low cost and the alloy has a high thermal conductivity, typically 180–200 W/mK. Additionally, the coefficient of thermal expansion of CuW is closely matched to both the coefficient of thermal expansion of the MMIC chips and the coefficient of thermal expansion of the materials typically utilized in other areas of the housing. However, this material is very hard, making it difficult to machine. To reduce costs, the machining operations required for this material should be minimized.

Regulator/Controller

Minimizing the amount of CuW material used in the housing 2, 102 serves to reduce costs. The use of the assembly 2,102 of the present invention results in a 5:1 reduction in the amount of CuW used for the RF housing 10,110. A similar reduction in material is achieved when the housing is made from any of the other suitable materials discussed previously.

For example, to reduce the amount of CuW used, the present invention moves the regulator/controller board out of the RF section 10, 110 and places it in the electronic section 24, 124 adjacent to the second planar surface 18, 118 of the RF section 10, 110. The DC and control signals are carried to the sealed RF MMIC area through glass feedthroughs 42, 142 in the electronic section 24, 124. The feedthroughs are glass conductors which are placed in vias in the RF section and soldered in place. The feedthroughs 42,142 extend out of the second planar surface 18,118 or the RF section 10,110 for a distance of approximately 250 to 280 mils. The use of feedthroughs 42, 142 is independent of the choice of interface 46, 146 and allows the module 2, 102 to have either a coax interface 52, 152 or a waveguide interface 48, 148 with no changes to the module housing or internal circuits. This interchangeability improves modularity and further reduces costs.

In addition to the low cost advantage of the surface mount technology, the architecture of the housing 2, 102 of the present invention allows the DC signals to be available in very close proximity to where they are being used inside the RF section 10, 110. The proximity of the DC signals and the RF section 10,110 is important to minimize signal attenuation associated with traveling between widely spaced parts and for power management. Typically, the distance of separation is typically 2 to 5 mils and should be minimized to below a preferred maximum of 10 mils.

Fabrication

A MMW housing consistent with the present invention can be made by the following method. The MMIC and connective substrates are epoxied onto the channelized RF housing 10,110 and the electronic components are surface mounted on the electronic housing 24,124. The electronic housing 24,124 is gold plated on a first planar surface 26,126 and the monolithic RF housing 10 is gold plated on a second planar surface 18. Alternatively, the RF housing 110 comprised of a channelized RF section 160 and a flat plate 170 is gold plated on the second planar surface 174 of the flat plate 170. The respective gold plated surfaces are then joined with the DC feedthroughs 42,142 being placed into corresponding holes 44,144 in the electrical housing 24,124. A thermal sheet is placed between the electrical housing 24,124 and the RF housing 10,110 and provides both a thermal contact and a seal. In one embodiment, the thermal sheet is a metal foil. The use of a thermal sheet compensates for any tolerances in the dimensions and surface finish of the components. Next, a RF cover 6,106 is disposed in the recessed edge 16,116 on the first planar surface 14,114 of the RF housing 10,110. A surface mount board 32,132 is then placed in the recessed edge 30,130 on the second planar surface 28,128 of the electrical housing 24,124. An electrical housing cover 34,134 is placed over the surface mount board 32,132. The assembled housing 2,102 is then fastened together by the use of connectors placed in threaded holes 40,140 in the corners. Finally, the interface connector 46,146 is attached by threaded fasteners.

Exemplary embodiments of the present invention provide unique solutions for a housing assembly and for the integration of the regulator/controller into the assembly that reduces costs. Housing solutions are provided using a combination of metals designed to meet requirements at a fraction of the cost. The material used for the housing is matched to the function of the feature within the housing. Additionally, only features requiring the benefits of a material of high cost are housed within an area constructed from high cost materials.

The regulator/controller, which has traditionally resided in the RF section, has also been relatively expensive because it is made out of micro-electronic circuits. The proposed packaging concepts moves the regulator/controller out of the small RF section which allows the use of larger low cost surface mount parts for this application.

The design also provides a common package capable of supporting frequency ranges from 20 GHz to 40 GHz.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A millimeter wave transceiver package comprising:
    a housing for RF components, the housing comprising, a plurality of recessed channels and wells disposed on the first planar surface, and a second planar surface having surface feedthroughs;
    an electrical housing, the electrical housing comprising a first planar surface adjacent to the second planar surface of the housing for RF components, and having a regulator/controller and through holes corresponding to the feedthroughs of the housing for RF components; and
    a surface mount board.

2. The package of claim 1, comprising:
    an RF cover, the RF cover disposed at a first edge of a vertical stack of multilayers;

a cover for the electrical housing and the surface mount board positioned at a second edge of the vertical stack; and an interface unit mounted on the housing for RF components.

3. The package of claim 2, wherein the housing for RF components is positioned as a second layer, with the first planar surface adjacent to the RF cover, the electrical housing is positioned as a third layer, and the surface mount board is positioned as a fourth layer adjacent to the third layer.

4. The package of claim 1, wherein the plurality of channels and wells are interconnected.

5. The package of claim 1, wherein only MMIC chips and connective substrates are disposed in the plurality of channels and wells.

6. The package of claim 1, wherein the housing for RF components is formed of a material selected from the group consisting of Copper Tungsten, Aluminum Silicon Carbide, Aluminum graphite, and Copper Molybdenum.

7. The package of claim 1, wherein the electrical housing is aluminum.

8. The package of claim 1, wherein the RF cover is made from Kovar.

9. The package of claim 1, wherein the RF cover is disposed over and seals the MMIC chips and connective substrates in the interconnected channels and wells.

10. The package of claim 1, wherein the interface unit is a coaxial interface.

11. The package of claim 1, wherein the interface unit is a waveguide interface.

12. The package of claim 1, wherein the regulator/controller is disposed in the electrical housing underneath the housing for RF components.

13. The package of claim 1, wherein glass feedthroughs provide electrical contact between the components disposed on the electrical housing and components disposed on the housing for RF components.

14. A method of making a millimeter wave transceiver assembly comprising the steps of:

forming a monolithic RF housing having a plurality of channels and wells on a first planar surface and DC feedthroughs on a second planar surface;

disposing a plurality of MMIC and connective substrates with epoxy on a gold plated second planar surface of the RF housing;

connecting a plurality of channels and wells to the gold plated second planar surface of the RF housing;

surface mounting a plurality of electronic components on a first planar surface of a electronic housing;

disposing a thermal sheet between the electrical housing and the RF housing;

joining the second planar surface of the RF housing with the first planar surface of the electrical housing such that the DC feedthroughs of the RF housing mate with the corresponding holes in the electrical housing;

disposing a RF cover in the recessed edge on the first planar surface of the RF housing;

disposing a surface mount board in the recessed edge on the second planar surface of the electrical housing;

disposing an electrical housing cover over the surface mount board;

fastening the assembly together; and connecting an interface to the RF housing.

15. The method of claim 14, wherein the plurality of channels and wells disposed on the first planar surface of the housing for RF components are interconnected.

16. A method of making a millimeter wave transceiver assembly comprising the steps of:

forming a plurality of interconnected channels and wells disposed on the first planar surface of a RF section of a housing for RF components;

forming a plurality of DC feedthroughs on a second planar surface of a flat plate layer of a housing for RF components;

forming a housing for RF components by joining a plurality of individual dies to the plurality of flat plate layer;

disposing a plurality of MMIC and connective substrates and securing the plurality of MMIC and connective substrates with epoxy;

surface mounting a plurality of electronic components on a first planar surface of a electronic housing;

gold plating a first planar surface of the electrical housing;

disposing a thermal sheet between the electrical housing and the RF housing;

joining the second planar surface of the flat plate of the RF housing with the first planar surface of the electrical housing such that the DC feedthroughs of the RF housing mate with the corresponding holes in the electrical housing;

disposing a RF cover in the recessed edge on the first planar surface of the RF housing;

disposing a surface mount board in the recessed edge on the second planar surface of the electrical housing;

disposing an electrical housing cover over the surface mount board;

fastening the assembly together; and connecting an interface means to the RF housing.

17. The method of claim 16, wherein the individual dies are formed by casting.

18. The method of claim 16, wherein the joining of a plurality of individual dies to a substrate layer is joining by silver-based epoxy.

19. The method of claim 16, wherein the joining of a plurality of individual dies to a flat plate is joining by a method selected from the group consisting of spiral patterns, dot patterns, and screening.

* * * * *

UNITED STATES PATENT AND TRADEMARK OFFICE
CERTIFICATE OF CORRECTION

PATENT NO.    : 6,594,479 B2
DATED         : July 15, 2003
INVENTOR(S)   : Danny F. Ammar et al.

It is certified that error appears in the above-identified patent and that said Letters Patent is hereby corrected as shown below:

<u>Column 7,</u>
Line 51, change "a electronic" to -- an electrical --.

<u>Column 8,</u>
Lines 1 and 38, change "the" (first occurrence) to -- a --;
Lines 3 and 16, change "the" to -- a --;
Line 21, change "a" to -- the --;
Line 29, change "a electronic" to -- an electrical --;

Signed and Sealed this

Second Day of December, 2003

JAMES E. ROGAN
*Director of the United States Patent and Trademark Office*